United States Patent [19]

Florian

[11] 4,209,155
[45] Jun. 24, 1980

[54] HEAVY-DUTY BRACKET AND HANGER ASSEMBLY EMPLOYING SAME

[75] Inventor: Roy S. Florian, Southington, Conn.

[73] Assignee: Nickson Industries, Inc., Plantsville, Conn.

[21] Appl. No.: 12,378

[22] Filed: Feb. 15, 1979

[51] Int. Cl.² .................................................. F16L 3/02
[52] U.S. Cl. ..................................... 248/62; 248/74 R
[58] Field of Search ............. 248/62, 60, 74 R, 74 PB

[56] References Cited

U.S. PATENT DOCUMENTS

| | | | |
|---|---|---|---|
| 1,986,861 | 1/1935 | Starr | 248/62 |
| 2,767,946 | 10/1956 | Weeks | 248/74 R |
| 2,892,234 | 6/1959 | Klein | 248/74 R |
| 2,905,743 | 9/1959 | Sylvester | 248/74 R |
| 3,227,406 | 1/1966 | Shelton et al. | 248/74 R |
| 3,305,199 | 2/1967 | Bayes et al. | 248/74 R |
| 3,632,069 | 1/1972 | Thayer | 248/74 PB |
| 3,735,950 | 5/1973 | Paintin | 248/62 |

Primary Examiner—Francis K. Zugel

[57] ABSTRACT

A hanger assembly for an exhaust pipe includes a bracket with a U-shaped body member that terminates in oppositely extending flange portions. The legs of the body portion have closed apertures that receive the bight member of a U-clamp. The closed configuration provides added strength and reduces the likelihood that the clamp will slip out of the bracket.

10 Claims, 3 Drawing Figures

HEAVY-DUTY BRACKET AND HANGER ASSEMBLY EMPLOYING SAME

BACKGROUND OF THE INVENTION

The present invention relates to hanger assemblies for tail pipes and the like, and it relates particularly to the brackets used in such hanger assemblies.

When hangers for exhaust systems are to be replaced, a common method that is employed is to replace a U-shaped hanger with a new hanger assembly. The assembly typically includes a bracket that allows an upside-down U-clamp to be used to support the exhaust pipe. This arrangement is employed, rather than a duplicate of the original equipment, because the original method of construction relies on access to locations that are relatively difficult to reach during a replacement operation. Accordingly, the upside-down U-clamp arrangement is used because it permits easy access during the replacement operation.

A typical prior-art bracket in such a hanger assembly is illustrated in U.S. Letters Pat. No. 3,735,950 to Paintin, which illustrates a U-clamp supported by a bracket that has a hook portion. Brackets similar to this have been used quite extensively for replacement hanger assemblies, and in many cases they have proved to be quite acceptable. However, there have been some instances of breakage, which suggests that the hanger-assembly brackets should be strengthened. However, an excessive increase in size is not desirable, both because of operational considerations and because of the associated cost increase.

It is accordingly an object of the present invention to provide greater strength in a hanger assembly than that which is provided by prior-art designs. It is a further object to achieve this additional strength without greatly increasing the size or cost of the bracket and simultaneously to improve its operational effectiveness.

SUMMARY OF THE INVENTION

The foregoing and related objects are achieved by an integrally formed hanger bracket for suspending a U-clamp from a support structure from which the clamp and a load supported by it are to be suspended. The bracket has a generally U-shaped body portion with spaced-apart legs and a web between the legs. The bracket also has generally planar flange portions that extend oppositely from the ends of the legs and are spaced from the web. The flange portions have apertures through them that are adapted to receive fasteners for mounting the bracket upon the support structure, and the legs of the U-shaped body portion have aligned apertures through them adjacent the web that are adapted to receive the U-shaped bight member of a U-clamp.

The web portion can conveniently have a surface that is convex relative to the legs of the body portion, and it is preferred that the apertures through the legs of the body portion extend through the full height of the legs and even into the web.

In the preferred embodiment, the apertures in the flange portions are offset from each other in the direction parallel to the legs.

It is also taught in the following description to provide a hanger assembly that includes the hanger bracket described above and a generally U-shaped bight member extending through the apertures in the legs of the body portion of the bracket. The bight member includes substantially parallel legs extending in the direction away from the flange portions. A clamp keeper is mounted on the legs, spaced from the web of the body portion of the bracket, and adapted to support a load located between the keeper and the web.

BRIEF DESCRIPTION OF THE DRAWINGS

These and further features and advantages of the present invention are described in connection with the attached drawings, in which.

DETAILED DESCRIPTION OF THE PREFERRED EMBODIMENT

Figure 1:
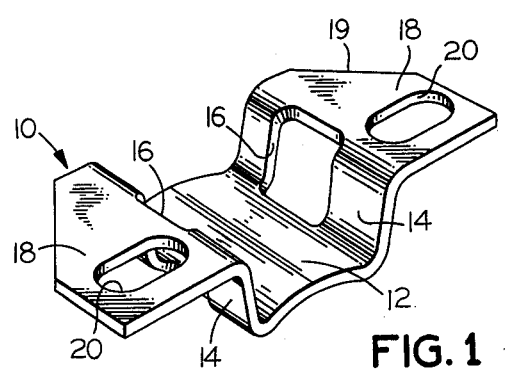
FIG. 1 is a perspective view of the bracket used in the hanger assembly of the present invention.

FIG. 1 is a perspective view of the hanger bracket of the present invention. The bracket, indicated by reference numeral 10, includes a generally U-shaped body portion with spaced-apart legs 14 and an arcuate web 12 between legs 14. The web is convex with respect to legs 14. Generally planar flange portions 18 extend oppositely from the ends of the legs of the U-shaped portion and are thereby spaced from web 12.

Legs 14 have apertures 16 that are aligned with each other and extend through the entire height of the legs and slightly into web 12 and flange portion 18 so as to permit the bight portion of a U-clamp to be inserted easily. Slots 20 are provided in flange portions 18 for mounting of the bracket on a support structure. Since there is some variation in the size of the original hanger and thus of the spacing of the holes with which slots 20 are to be aligned, slots 20 are elongated in the direction perpendicular to legs 14 in order to permit slots 20 to align with a variety of support-structure hole spacings.

It will be noted that slots 20 and apertures 16 are offset in the direction parallel to legs 14. This feature contributes to the strength of the bracket because it allows a greater amount of material in the space between slots 20 and apertures 16 than there would be if slots 20 and apertures 16 were aligned. Since this region may be expected to be subjected to some stress, it is desirable that there be considerable spacing, as there is in bracket 10, between slots 20 and apertures 16. The offset also has another advantage in that it allows the provision of diagonal edge 19. As opposed to a perpendicular edge, this diagonal edge requires the use of less materal and also allows more convenient maneuvering of the bracket in the tight places where it can be expected to be used.

Figure 2:
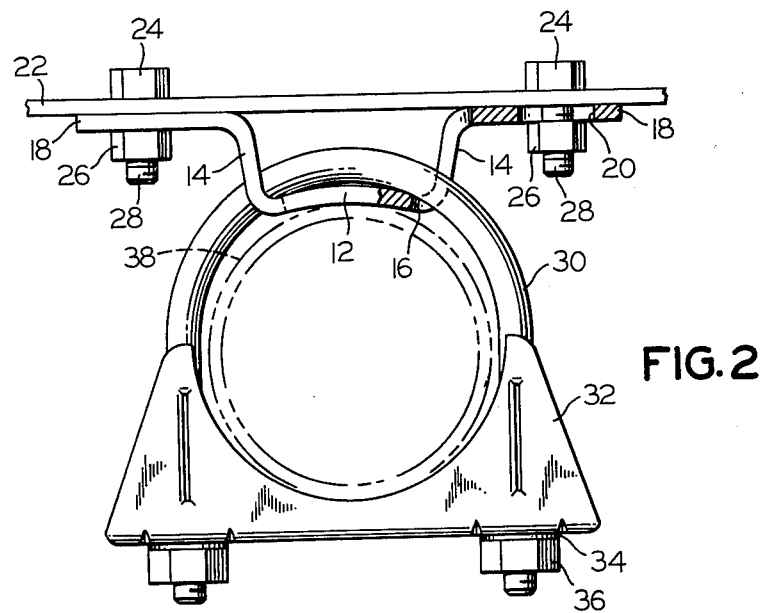
FIG. 2 is an elevational view, partly in section, of the hanger assembly viewed in a direction axial of the exhaust pipe being supported.
Figure 3:
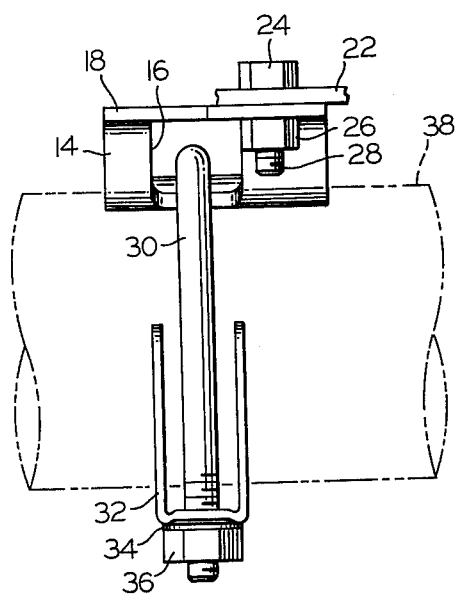
FIG. 3 is an elevational view of the hanger assembly viewed in a direction perpendicular to the axis of the tail pipe.

FIGS. 2 and 3 illustrate the hanger assembly of the present invention in place on an appropriate support structure 22. Bolts, shown in the figures with heads 24 and shanks 28, extend through holes already present in the support structure and through slots 20 in flange portions 18 of bracket 10. Nuts 26 cooperate with the bolts to act as fasteners that hold the bracket in place. In the figures the bolts are shown generally centered in slots 20, but their positions vary depending on the spacing of the holes in the original equipment.

A U-shaped bight member 30 extends through apertures 16, and a saddle or clamp keeper 32 receives the legs of bight member 30. The keeper 32 is held in place by appropriate means such as nut 36 and washer 34. As can be seen, the keeper 32 has an arcuate load surface facing the concave side of the bracket web 12 to accommodate the typically round exhaust pipe 38.

An inspection of the hanger assembly just described reveals that it is arranged to give greater strength than a hook-type arrangement of the same size. Since the bight member 30 is received in aperture 16—which is closed, unlike the open hook of the prior art—the web 12 is supported by the flange on both sides of the bight member 30, thus affording superior strength. In addition to superior strength, the closed configuration prevents the U-clamp from falling off the bracket during assembly, while the bracket is still relatively loose from the support structure. The clamp can thus be left very loose during alignment of the entire exhaust system, thereby greatly facilitating the alignment process. Finally, the clamp is less likely to fall out of the bracket during use because, even if the bracket is relatively loose, the clamp cannot fall off unless the bracket itself falls off.

Having thus described the invention, I claim:

1. An integrally formed hanger bracket for suspending a U-clamp from a support structure from which the clamp and a load supported thereby are to be suspended, said bracket having a generally U-shaped body portion with spaced-apart legs and a web therebetween, said bracket also having generally planar flange portions extending oppositely from the upper ends of said legs in spaced relationship to said web, said flange portions having apertures therethrough adapted to receive fasteners for mounting the bracket upon the associated support structure, said legs of said U-shaped body portion having aligned apertures therethrough and extending at least to said web and adapted to receive the U-shaped bight member of an associated U-clamp, said apertures in said legs extending over at least the major portion of the length thereof whereby the U-shaped bight member of the associated U-shaped clamp may be readily inserted thereinto and will seat upon said web.

2. The hanger bracket of claim 1 wherein said web portion has a surface that is convex relative to said legs of said body portion.

3. The hanger bracket of claim 1 wherein said apertures through said legs of said body portion extend through the full height of said legs.

4. The hanger bracket of claim 3 wherein said apertures through said legs extend into said web.

5. The hanger bracket of claim 1 wherein said apertures in said flange portions are laterally offset from said apertures in said legs in the direction parallel to said legs.

6. A hanger assembly for suspending a load such as an exhaust pipe from a support structure from which it is to be suspended comprising:
   a. a hanger bracket having a generally U-shaped body portion with spaced-apart legs and a web therebetween, said bracket also having generally planar flange portions that extend oppositely from the upper ends of the legs of said body portion in spaced relationship to said web, said flange portions having apertures therethrough adapted to receive fasteners for mounting said bracket on the associated support structure, said legs of said U-shaped body portion having aligned apertures therethrough and extending at least to said web, said apertures in said legs extending over at least the major portion of the length thereof;
   b. a generally U-shaped bight member extending through said apertures in said legs of said body portion of said bracket with the central portion thereof disposed upon said web of said body portion thereof, said bight member including substantially parallel legs extending in the direction away from said flange portions, said bight member being readily insertable through said apertures in said legs of said bracket; and
   c. a clamp keeper mounted on said legs, spaced from said web of said body portion of said bracket, and adapted to support a load located between said keeper and said web.

7. The hanger assembly of claim 6 wherein said web of said body portion of said bracket has a surface that is convex relative to said leg portions of said body portion.

8. The hanger assembly of claim 6 wherein said apertures through said legs of said body portion of said clamp extend the full height of said legs.

9. The hanger assembly of claim 8 wherein said apertures through said legs of said body portion of said bracket extend into said web.

10. The hanger assembly of claim 6 wherein said apertures in said flange portions are laterally offset from said apertures in said legs in the direction parallel to said legs.

* * * * *